(12) United States Patent
Zeng et al.

(10) Patent No.: US 11,971,941 B2
(45) Date of Patent: Apr. 30, 2024

(54) ONLINE SEARCH METHOD AND DEVICE ACCOUNTING FOR RELEVANCE AND DIFFERENCE

(71) Applicant: TONGJI UNIVERSITY, Shanghai (CN)

(72) Inventors: Guosun Zeng, Shanghai (CN); Chunling Ding, Shanghai (CN); Youli Fang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 17/953,325

(22) Filed: Sep. 27, 2022

(65) Prior Publication Data
US 2023/0195817 A1   Jun. 22, 2023

(30) Foreign Application Priority Data
Dec. 21, 2021  (CN) .......................... 202111568976.5

(51) Int. Cl.
*G06F 16/954*  (2019.01)
*G06F 16/9538* (2019.01)

(52) U.S. Cl.
CPC ........ *G06F 16/954* (2019.01); *G06F 16/9538* (2019.01)

(58) Field of Classification Search
CPC .............. G06F 16/954; G06F 16/9538; G06F 16/3331; G06F 16/953; G06F 16/906; G06F 16/9535; G06F 17/16
See application file for complete search history.

(56) References Cited

U.S. PATENT DOCUMENTS

2006/0074883 A1* 4/2006 Teevan ............... G06F 16/9535
2017/0139916 A1* 5/2017 Cama ................. G06F 16/9535

\* cited by examiner

*Primary Examiner* — Mark D Featherstone
*Assistant Examiner* — Kweku William Halm
(74) *Attorney, Agent, or Firm* — JCIP GLOBAL INC.

(57) ABSTRACT

The present invention relates to an online search method and device that accounts for relevance and difference, wherein the method comprises: determining an initial search result set according to a query request input by a user, and selecting a plurality of search results with the greatest degrees of difference from the initial search result set, as a final search result set. The specific process comprises: initially obtaining a plurality of candidate results according to the query request submitted by the user; using a semantic matrix to describe the attribute characteristics of documents corresponding to the candidate results; calculating similarities among the documents according to the attribute characteristics of the documents, and then clustering the candidate results into a plurality of cluster blocks; selecting a representative from each cluster block; and constructing the final search result set according to the selected representatives.

9 Claims, 1 Drawing Sheet

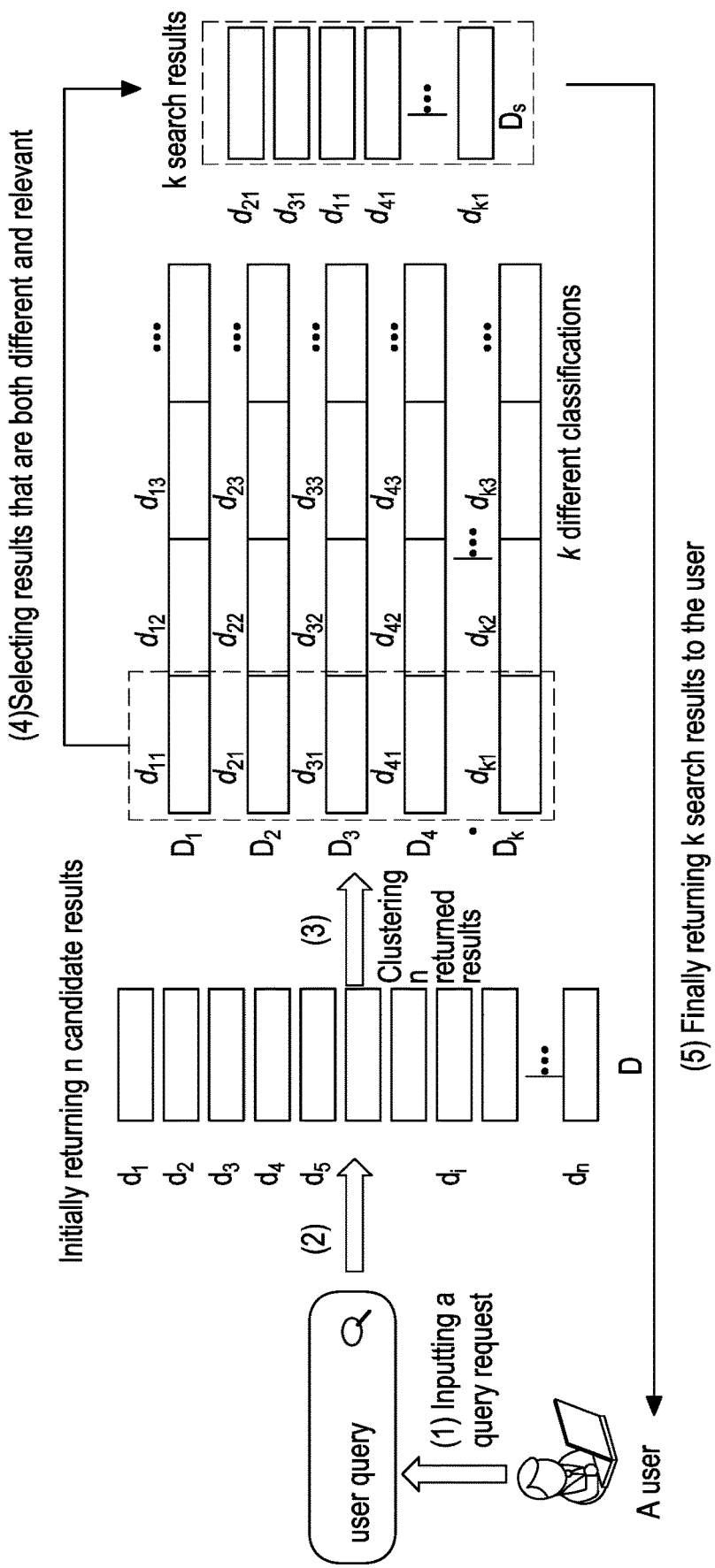

ONLINE SEARCH METHOD AND DEVICE ACCOUNTING FOR RELEVANCE AND DIFFERENCE

CROSS-REFERENCE TO RELATED APPLICATION

This application claims the priority benefit of China application serial no. 202111568976.5, filed on Dec. 21, 2021. The entirety of the above-mentioned patent application is hereby incorporated by reference herein and made a part of this specification.

BACKGROUND

Technical Field

The present invention relates to the technical field of search, and in particular to an online search method and device accounting for relevance and difference.

Description of Related Art

Search engines are effective tools for people to find information and acquire knowledge from the Internet. When a user submits a search request online, they may return massive results according to the user's intention. In the Internet era, what worries the internet users is not a failure to find information, but finding too much useless information. In essence, they feel it hard to find the information which they really want and are satisfied with. At present, massive search results returned by search engines are often sorted in order of relevance, with those that are highly relevant to a search request returned first and listed at the top for users to select. In fact, there are many ways to sequence search results. For example, they can be sequenced by the similarity of the semantics of search request and search result content, the number of links to the web pages which return search results (PageRank), and the order of time spent searching. With the expanded and in-depth application of the Internet, people's demand for online search becomes endless. In addition to targeted search in a professional field, general search on the WAN is also expected. We need both centralized and specific search and associative search which is expansive and divergent, and both synonymous positive search and antisense negative search. In other words, there are diverse search needs.

Today, what is widely used in online search is the keyword search method in which users can obtain search results just by inputting a small number of keywords as a search request and submitting it to a search engine. As a result of simple and easy operation, the method is widely used among users. However, keywords are selected at will, without any constraint or restriction. They can be some ambiguous and general phrases. After receiving such phrases, a search engine cannot accurately understand users' search intention, resulting in a fact that users want to get different search results by using the same phrase as a search request. In this case, it may not be possible to cover users' all search intention if search results are sequenced only by the relevance between returned results and search requests.

In addition, several results which are highly relevant to search requests and very similar with each other will be placed at the top of a list of returned search results when result sequencing is done by the relevance between search results and search requests. After browsing one of them, users may find it difficult to get interested in, and will thus ignore other nearby candidate results. Therefore, they are redundant for users. All this greatly reduces users' search efficiency and experience.

SUMMARY

The present invention provides an online search method and device accounting for relevance and difference, so as to overcome the above-mentioned defects in the prior art that when only sorting according to the relevance of the search results and the query request, a redundancy phenomenon occurs, which greatly reduces the user's search efficiency and gives an extremely poor user search experience.

The object of the present invention can be realized through the following technical solutions.

An online search method accounting for relevance and difference, comprising determining an initial search result set according to a query request input by a user, wherein the initial search result set comprises a plurality of search results, and wherein the method further comprises: selecting a plurality of search results with the greatest degrees of difference from the initial search result set, as a final search result set.

Further, the degree of difference is an accumulated value of difference values between one search result and other search results in the initial search result set.

Further, an obtaining expression of the final search result set is:

$$\begin{cases} rel(q, d_i) \geq \delta_0, i = 1, 2, \ldots, k \\ D^* \subset D \\ |D^*| = k \\ D^* = \underset{d_i, d_i \in D, i=1,2,\ldots,k}{\arg\max} \left( \sum_{d_i, d_j, i \neq j, d_i, d_j \in D, i, j \in [1,k]} div(d_i, d_j) \right) \end{cases}$$

In the formula, $d_i$ is an ith search result in the initial search result set, q is a query request, $rel(q, d_i)$ is a relevance between the search result $d_i$ and the query request q, $\delta_0$ is a relevance threshold, k is the number of search results in the final search result set, $D^*$ is the final search result set, D is the initial search result set, $D=\{d_1, d_2, \ldots, d_n\}$, k<n, $div(d_i, d_j)$ is a difference value between the ith search result $d_i$ and the j-th search result $d_j$.

Further, an obtaining process of the final search result set specifically comprises the following steps: S1: initially obtaining n candidate results D according to the query request submitted by the user; S2: using a semantic matrix to describe the attribute characteristics of documents corresponding to the candidate results; S3: calculating similarities among the documents according to the attribute characteristics of the documents, and then clustering the n candidate results D into k-type clustering blocks $D_1, D_2, \ldots, D_k$; S4: selecting a representative $d_i^*$ from each clustering block $D_1, D_2, \ldots, D_k$; S5: constructing the final search result set $D^*=\{d_1^*, d_2^*, \ldots, d_k^*\}$ according to the selected representatives.

Further, step S3 specifically comprises the following steps: S301: calculating the similarities among the documents according to the attribute characteristics of the documents, constructing a document graph, and calculating an adjacency matrix W and a degree matrix D of the document graph; S302: calculating an Laplace matrix L=D−W; S303: normalizing the Laplace matrix $L_{rw}=D^{-1/2}LD^{-1/2}$; S304: calculating feature vectors $u_1, u_2, \ldots, u_k$ corresponding to the smallest k feature values of the $L_{rw}$, respectively; S305:

forming a matrix $U=\{u_1, u_2, \ldots, u_k\}$, $U \in R^{n \times k}$ according to the feature vectors $u_1, u_2, \ldots, u_k$; S306: taking $y_i \in R^k$ as a vector of an i-th row of U, where $i=1, 2, \ldots, n$; S307: using a k-means algorithm to cluster new sample points $Y=\{y_1, y_2, \ldots, y_n\}$ into $D_1, D_2, \ldots, D_k$.

Further, for a document d, assuming that the document contains sentences $s_1, s_2, \ldots, s_n$, a semantic vector corresponding to each sentence is $s_i=[v_{i1}, v_{i2}, \ldots, v_{im}]$, $i=1, 2, \ldots, n$; an expression of the attribute characteristics of the document is:

$$\Psi_d = \begin{bmatrix} s_1 \\ s_2 \\ \vdots \\ s_n \end{bmatrix} = \begin{bmatrix} c_{11}, c_{12}, \ldots, c_{1m} \\ c_{21}, c_{22}, \ldots, c_{2m} \\ \vdots \\ c_{n1}, c_{n2}, \ldots, c_{nm} \end{bmatrix} = \begin{bmatrix} v_{11}, v_{12}, \ldots, v_{1m} \\ v_{21}, v_{22}, \ldots, v_{2m} \\ \vdots \\ v_{n1}, v_{n2}, \ldots, v_{nm} \end{bmatrix}$$

where $\Psi_d$ is the attribute characteristics of the document d.

Further, if a document has less than n sentences, the document is filled with empty sentences; and, if a document has more than n sentences, duplicate sentences or sentences with the least information are deleted.

Further, the specific process of constructing the document graph is as follows: considering each document as a vertex in a graph $G=(V, E)$, $V=\{v_1, v_2, \ldots, v_n\}$, that is, $d_1=v_1$, $d_2=v_2, \ldots, d_n=v_n$; considering a relationship between the documents $d_i$ and $d_j$ as a connecting edge $e_{ij}$ between the vertices $v_i$ and $v_j$, wherein a weight $w_{ij}$ of the connecting edge $e_{ij}$ is equal to the similarity between the documents $d_i$ and $d_j$.

Further, selecting the representative $d_i^*$ is specifically to sort the relevance of each result in the clustering block, and to select a result with the greatest relevance as the representative $d_i^*$.

This embodiment also provides an online search device that accounts for relevance and difference, wherein the device comprises a memory and a processor, wherein, the memory stores a computer program, and the processor invokes the computer program to execute the above-mentioned the steps of the method.

Compared with the prior art, the present invention has the following advantages.

(1) The present invention not only considers the relevance between the search results and the query request, but also considers the differences among the search results, breaks through the limitation that traditional search engines only provide a large number of relevant search results, and provides core, differentiated and diversified search results, is especially suitable for some searching occasions where there are ambiguous short query keywords, and can improve the search satisfaction of the users.

(2) The present invention innovatively uses the spectral graph theory to construct similarity graphs among a plurality of documents, divides and clusters the plurality of documents through graph clustering, and finds differences in the search results; meanwhile, it pays attention to the relevance between the search results and the query request, and selects the most representative search result from each cluster block and returned to the user, which reduces the redundancy rate of the search results.

BRIEF DESCRIPTION OF THE DRAWINGS

FIGURE is a schematic flowchart of an online search method accounting for relevance and difference according to an embodiment of the present invention.

DESCRIPTION OF THE EMBODIMENTS

In order to make the purposes, technical solutions and advantages of the embodiments of the present invention clearer, the technical solutions in the embodiments of the present invention will be clearly and completely described below with reference to the FIGURES in the embodiments of the present invention. Obviously, the described embodiments are some embodiments of the present invention, but not all embodiments. The components of the embodiments of the present invention generally described and illustrated in the FIGURES herein may be arranged and designed in a variety of different configurations.

Thus, the following detailed description of the embodiments of the present invention provided in the figures are not intended to limit the scope of the invention as claimed, but are merely representative of selected embodiments of the present invention. On the basis of the embodiments of the present disclosure, all other embodiments acquired by those of ordinary skill in the art without making inventive efforts fall within the scope of protection of the present disclosure.

It should be noted that like numerals and letters refer to like items in the following FIGURES, so once an item is defined in one FIGURE, it does not require further definition and explanation in subsequent FIGURES.

Embodiment 1

In view of the shortcomings of the traditional online search method, this embodiment not only considers relevance between search results and a query request, but also considers differences among the search results, so as to provide a user with differentiated and diversified search results. This embodiment accounts for an online search method accounting for relevance and difference, wherein the method comprises the following steps: determining an initial search result set according to a query request input by a user, wherein the initial search result set comprises a plurality of search results; and selecting a plurality of search results with the greatest degrees of difference from the initial search result set, as a final search result set.

Assuming that the query request input by the user is q, the initial search result set of n search results initially determined by the search engine is $D=\{d_1, d_2, \ldots, d_n\}$. In order to provide the user with the differentiated and diversified search results as much as possible, it is necessary to select a final search result set $D^*=\{d^*_1, d^*_2, \ldots, d^*_k\}$ containing k search results with the largest degrees of difference from the set D, and return it to the user as final search results, $k<n$. Then, $D^*$ should satisfy the following requirements:

$$\begin{cases} rel(q, d_i) \geq \delta_0, i = 1, 2, \ldots, k \\ D^* \subset D \\ |D^*| = k \\ D^* = \underset{d_i, d_j \in D, i=1,2,\ldots,k}{\arg\max} \left( \sum_{d_i, d_j, i \neq j, d_i, d_j \in D, i,j \in [1,k]} div(d_i, d_j) \right) \end{cases}$$

where, $rel(q, d_i) \geq \delta_0$, indicating that candidate results $d_i$ must be related to the query request q, and the relevance must be greater than or equal to a predetermined threshold $\delta_0$. The final search result set $D^*=\{d_1^*, d_2^*, \ldots, d_k^*\}$, wherein each item $d_i^*$ and query request q must satisfy the condition of relevance, and by solving a target maximum value $$\arg\max_{d_i, d_j \in i=1,2,\ldots,k} \left( \sum_{d_i, d_j, i \neq j, d_i, d_j \in D, i, j \in [1,k]} div(d_i, d_j) \right),$$

the degrees of difference among the search results D*={$d_1$*, $d_2$*, ..., $d_k$*} are the largest. Thus, reasonable and diverse search results are provided to the user.

As shown in FIGURE, in order to obtain the above-mentioned final search results, the overall implementation of this embodiment is as follows.

(1) Description of semantic features of documents corresponding to the search results: the search results returned by the search engine is usually a URL, corresponding to a web page, which can be simply regarded as a body document in essence. Semantic description of the documents is a premise of calculating and analyzing the documents, and the description of the documents of the search results directly affects the effect of subsequent clustering. For this reason, the document features are described by a semantic matrix. For a body document d, assuming that the document contains sentences $s_1, s_2, \ldots, s_n$, and a semantic vector corresponding to each sentence is $s_i=[v_{i1}, v_{i2}, \ldots, v_{im}]$, i=1, 2, ..., n, then the semantic matrix of the document d is defined as follows:

$$\Psi_d = \begin{bmatrix} s_1 \\ s_2 \\ \vdots \\ s_n \end{bmatrix} = \begin{bmatrix} c_{11}, c_{12}, \ldots, c_{1m} \\ c_{21}, c_{22}, \ldots, c_{2m} \\ \vdots \\ c_{n1}, c_{n2}, \ldots, c_{nm} \end{bmatrix} = \begin{bmatrix} v_{11}, v_{12}, \ldots, v_{1m} \\ v_{21}, v_{22}, \ldots, v_{2m} \\ \vdots \\ v_{n1}, v_{n2}, \ldots, v_{nm} \end{bmatrix}.$$

The semantic matrix $\Psi_d$ of the document is an n-row, (m×ζ) column, fixed-size two-dimensional real matrix. According to an actual application situation, the number n of the sentences, the number m of feature words, and the dimension ζ of each word vector can be rationally specified in advance. The number of sentences contained in different document d varies. When there are not less than n sentences, the document is filled with empty sentences. When there are more than n sentences, duplicate sentences or sentences with the least information are deleted.

(2) Division and clustering of the plurality of documents: when a search engine searches according to the user request, a large number of result documents may initially be obtained. Clustering the large number of result documents is beneficial to more accurately selecting a set of result documents with large differences. Therefore, the division and clustering of the plurality of documents is an important step. When clustering the plurality of search result documents D={$d_1, d_2, \ldots, d_n$}, each document can be regarded as a vertex in a graph G=(V, E), V={$v_1, v_2, \ldots, v_n$}, i.e., $d_1=v_1$, $d_2=v_2, \ldots, d_n=v_n$. The relationship between the documents $d_i$ and $d_j$ is regarded as a connecting edge $e_{ij}$ between the vertices $v_i$ and $v_j$, and the weight $w_{ij}$ of the connecting edge $e_{ij}$ is equal to the similarity between the documents $d_i$ and $d_j$. According to a spectral graph clustering theory, vertices with similar distances, that is, documents with large content similarity, can be clustered together, and finally $d_1, d_2, \ldots, d_n$ are clustered into $D_1, D_2, \ldots, D_k$ in a total of k categories, i.e., $D_1 \cup D_2 \cup \ldots \cup D_k = D$, $D_1 \cap D_2 \cap \ldots \cap D_k = \phi$.

(3) Selecting representatives from each document clustering block: in a clustering block, there may be a plurality of documents, and only one document needs to be selected. Because the goal of the search method of the present invention is that the final returned search results have the greatest degrees of difference and are related to the search request q as much as possible. Therefore, in each clustering block, according to the relevance ranking of the primary selection results, the first document in this clustering block is selected as the only representative of this clustering block, and returned to the user, as a member of the final diversified search result set.

The detailed description of the specific implementation process of the above overall solution is as follows.

Assuming that the query request submitted by the user to the search engine is q, the search engine will initially obtain n candidate search results, describe the document corresponding to each search candidate result through the semantic matrix $\Psi_d$, and then calculate the similarity $s_{ij}(d_i, d_j)$ between the two documents $d_i$ and $d_j$, construct a special graph Gs(V,E) according to the spectral graph theory, V={$d_1, d_2, \ldots d_n$}, $e_{ij}=s_{ij}$, $e_{ij} \in E$, and thus get an adjacency matrix W of the graph, a degree matrix D, a Laplace matrix L, and perform k-way clustering on these n vertices. Finally, a relevant document is selected from each clustering block and returned to the user. The specific algorithm steps are as follows:

input: the query request q submitted by the user to the search engine;

output: k related and different search results D*={$d_1$*, $d_2$*, ..., $d_k$*};

S1: according to the query request q submitted by the user, the search engine initially obtains n candidate results D={$d_1, d_2, \ldots, d_n$};

S2: using a semantic matrix to describe the attribute characteristics $\Psi_{d1}, \Psi_{d2}, \ldots, \Psi_{dn}$ of documents corresponding to the candidate results;

S3: according to the spectral clustering theory, the n search results are clustered into k categories $D_1, D_2, \ldots, D_k$;

S301: calculating the similarities $s_{ij}(d_i, d_j)$ among the documents, constructing a special graph, and calculating an adjacency matrix W and a degree matrix D of the graph;

S302: calculating an Laplace matrix L=D−W;

S303: normalizing the Laplace matrix $L_{rw}=D^{-1/2}LD^{-1/2}$;

S304: calculating feature vectors $u_1, u_2, \ldots, u_k$ corresponding to the smallest k feature values of the $L_{rw}$, respectively;

S305: forming the above k column vector feature vectors into a matrix U={$u_1, u_2, \ldots, u_k$}, U ∈ $R^{n \times k}$;

S306: taking $y_i \in R^k$ as a vector of an i-th row of U, where i=1, 2, ..., n;

S307: using a k-means algorithm to cluster new sample points Y={$y_1, y_2, \ldots, y_n$} into $D_1, D_2, \ldots, D_k$;

S4: selecting one representative $d_i$* from each clustering block $D_1, D_2, \ldots, D_k$;

S5: constructing a differentiated and diversified search result set D*={$d_1$*, $d_2$*, ..., $d_k$*}, and finally returning it to the user.

For example:

Assuming that the query requests q of user a and user b are both "apple", user a wants to search for relevant information about "apple phone", and user b wants to search for relevant information about "apple fruit". Search results returned by the traditional search method are as shown in Table 1. It can be seen that the first three items in the search results neither satisfy user a nor user b. However, search results returned by the search method of the present invention are as shown in Table 2. It is not difficult to find that the first three items of the returned results satisfy both user a and user b, indicating that the method of the present invention provides diversified returned search results that consider both relevance and difference, and improves the search efficiency and satisfaction of users.

TABLE 1

Results returned by a traditional search method

| Rank | Search Results |
|------|----------------|
| 1 | d1: Apple Inc. |
| 2 | d2: Apple Inc. |
| 3 | d3: Apple stock |
| 4 | d4: Apple phone |
| 5 | d5: Apple phone |

TABLE 2

Results returned by the search method of the present invention

| Rank | Search Results |
|------|----------------|
| 1 | d1: Apple Inc. |
| 2 | d2: Apple phone |
| 3 | d3: apple fruit |
| 4 | d4: Apple watch |
| 5 | d5: Apple stock |

This embodiment also provides an online search device that accounts for relevance and difference, wherein the device comprises a memory and a processor, wherein, the memory stores a computer program, and the processor invokes the computer program to execute the above-mentioned the steps of the method accounting for relevance and difference.

The preferred embodiments of the present invention have been described in detail above. It should be understood that those skilled in the art can make numerous modifications and changes according to the concept of the present invention without creative efforts. Therefore, any technical solution that can be obtained by those skilled in the art through logical analysis, reasoning or limited experiments on the basis of the prior art according to the concept of the present invention shall fall within the protection scope determined by the claims.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An online search method accounting for relevance and difference, comprising:
   S1: determining an initial search result set having n candidate results based on results returned by a search engine according to a query request input by a user, wherein the initial search result set is $D=\{d_1, d_2, \ldots, d_n\}$;
   S2: using a semantic matrix to describe attribute characteristics of documents corresponding to the candidate results;
   S3: calculating similarities among the documents according to the attribute characteristics of the documents, and then using a k-means algorithm to cluster the n candidate results into k-type clustering blocks $D_1, D_2, \ldots, D_k$, wherein k<n;
   S4: selecting a representative $d_i^*$ from each of the clustering blocks $D_1, D_2, \ldots, D_k$; and
   S5: constructing a final search result set $D^*=\{d_1^*, d_2^*, \ldots, d_k^*\}$ according to the selected representatives;

and returning the final search result set to an interface provided by the search engine.

2. The online search method accounting for relevance and difference according to claim 1, wherein the degree of difference is an accumulated value of difference values between one search result and other search results in the initial search result set.

3. The online search method accounting for relevance and difference according to claim 1, wherein an obtaining expression of the final search result set is:

$$\begin{cases} rel(q, d_i) \geq \delta_0, i = 1, 2, \ldots, k \\ D^* \subset D \\ |D^*| = k \\ D^* = \underset{d_i, d_i \in D, i=1,2,\ldots,k}{\arg\max} \left( \sum_{d_i, d_j, i \neq j, d_i, d_j \in D, i,j, \in [1,k]} div(d_i, d_j) \right) \end{cases}$$

wherein, $d_i$ is an i-th search result in the initial search result set, q is a query request, $rel(q, d_i)$ is a relevance between the search result $d_i$ and the query request q, $\delta_0$ is a relevance threshold, k is the number of search results in the final search result set, $D^*$ is the final search result set, D is the initial search result set, $D=\{d_1, d_2, \ldots, d_n\}$, k<n, $div(d_i, d_j)$ is a difference value between the i-th search result di and the j-th search result $d_j$.

4. The online search method accounting for relevance and difference according to claim 1, wherein step S3 specifically comprises following steps:
   S301: calculating the similarities among the documents according to the attribute characteristics of the documents, constructing a document graph, and calculating an adjacency matrix W and a degree matrix D of the document graph;
   S302: calculating an Laplace matrix L=D−W;
   S303: normalizing the Laplace matrix $L_{rw}=D^{-1/2}LD^{-1/2}$;
   S304: calculating feature vectors $u_1, u_2, \ldots, u_k$ corresponding to a smallest k feature values of the $L_{rw}$, respectively;
   S305: forming a matrix $U=\{u_1, u_2, \ldots, u_k\}$, $U \in R^{n \times k}$ according to the feature vectors $u_1, u_2, \ldots, u_k$;
   S306: taking $y_i \in R^k$ as a vector of an i-th row of U, where i=1, 2, ..., n;
   S307: using the k-means algorithm to cluster new sample points $Y=\{y_1, y_2, \ldots, y_n\}$ into $D_1, D_2, \ldots, D_k$.

5. The online search method accounting for relevance and difference according to claim 1, wherein, for a document d, assuming that the document contains sentences $s_1, s_2, \ldots, s_n$, a semantic vector corresponding to each of the sentences is $s_i=[v_{i1}, v_{i2}, \ldots, v_{im}]$, i=1, 2, ..., n; an expression of the attribute characteristics of the document is:

$$\Psi_d = \begin{bmatrix} s_1 \\ s_2 \\ \vdots \\ s_n \end{bmatrix} = \begin{bmatrix} c_{11}, c_{12}, \ldots, c_{1m} \\ c_{21}, c_{22}, \ldots, c_{2m} \\ \vdots \\ c_{n1}, c_{n2}, \ldots, c_{nm} \end{bmatrix} = \begin{bmatrix} v_{11}, v_{12}, \ldots, v_{1m} \\ v_{21}, v_{22}, \ldots, v_{2m} \\ \vdots \\ v_{n1}, v_{n2}, \ldots, v_{nm} \end{bmatrix},$$

where $\Psi_d$ is the attribute characteristics of the document d.

6. The online search method accounting for relevance and difference according to claim 5, wherein, if a document has less than n sentences, the document is filled with empty sentences; and, if a document has more than n sentences, duplicate sentences or sentences with the least information are deleted.

7. The online search method accounting for relevance and difference according to claim 1, wherein, specific process of constructing the document graph is as follows:

considering each of the documents as a vertex in a graph $G=(V, E)$, $V=\{v_1, v_2, \ldots v_n\}$, that is, $d_1=v_1$, $d_2=v_2, \ldots, d_n=v_n$; considering a relationship between the documents $d_i$ and $d_j$ as a connecting edge $e_{ij}$ between the vertices $v_i$ and $v_j$, wherein a weight $w_{ij}$ of the connecting edge $e_{ij}$ is equal to a similarity between the documents $d_i$ and $d_j$.

8. The online search method accounting for relevance and difference according to claim 1, wherein, selecting the representative $d_i^*$ is specifically to sort the relevance of each of the search results in each of the clustering blocks, and to select a search result with the greatest relevance as the representative $d_i^*$.

9. An online search device accounting for relevance and difference, wherein the device comprises a memory and a processor, and wherein the memory stores a computer program, and the processor invokes the computer program to execute the steps of the method in claim 1.

* * * * *